May 12, 1931. W. C. BULL 1,805,389
FABRICATING MACHINE FOR LAMINATED GLASS PRODUCTS
Filed July 12, 1927   9 Sheets-Sheet 1

Fig.1.

INVENTOR
William C. Bull,
BY
ATTORNEY

May 12, 1931.  W. C. BULL  1,805,389

FABRICATING MACHINE FOR LAMINATED GLASS PRODUCTS

Filed July 12, 1927  9 Sheets-Sheet 5

INVENTOR.
William C. Bull,
BY
ATTORNEY

Patented May 12, 1931

1,805,389

UNITED STATES PATENT OFFICE

WILLIAM C. BULL, OF BROOKLYN, NEW YORK, ASSIGNOR TO WILLIAM C. BULL, INC., A CORPORATION OF DELAWARE

FABRICATING MACHINE FOR LAMINATED GLASS PRODUCTS

Application filed July 12, 1927. Serial No. 205,132.

This invention relates to the manufacture of a laminated glass product having the characteristic functions of being resistant to shocks and being substantially shatterless under impact of missiles, such as bullets, thereby rendering it available for various utilitarian purposes, such as for automobile windshields and window lights, and for armored vehicles where the so-called bulletproof glass has special utility.

The commercial uses for reinforced glass are becoming so diversified that a means and method for economical manufacture on a large scale has become a vital factor. This problem is met by the present invention which provides a fabricating machine operating on the basic principle of sealing in an oven a suitable press for the glass product with means for supplying dry heat to the oven while the glass product is under pressure, and containing improved features of construction which provide for the successful production of a laminated glass product so transparent and colorless that it is difficult to distinguish it from a sheet of solid plate glass when examined for reflection, transparency and color, at the same time possessing the important physical condition of being unsplinterable or shatterless, as well as resistant to shock and the impact of missiles.

Therefore, chiefly the invention has in view a fabricating machine for a laminated glass product which provides for the making of a superior product of this kind under uniform and economical manufacturing conditions. To that end the invention specially contemplates a fabricating machine of that kind which is so designed in its entirety, and with respect to the various units and instrumentalities forming a part thereof, as to constitute one of the links of a plant lay-out for large "factory production" of a laminated glass product under the most improved and economical conditions.

More specifically an object of the present invention is to improve and carry forward the inventions of my former patents relating to this subject, namely, Patent #1,539,329 granted May 26, 1925, Patent #1,553,667, granted September 15, 1925 and Patent #1,575,969, granted March 9, 1926. With that in view the present invention has a novel and practical multiple press device embodying independently operable units, each of which units has a complete organization of instrumentalities functioning to exert a pliable and progressive pressure upon opposite sides of the laminated product, limiting to a minimum the risk of fracture of the glass and obtaining a uniform and undefective product throughout.

Also, the present invention has for an object to provide novel and practical means for handling the laminated glass product in each of the individual press units and to provide reliable and effective means for controlling the pressure and vacuum lines which are operatively associated with the pliable pressure members. Furthermore, a special provision of the invention is to associate with the press device or press structure suitable heating means which in effect form a part of the press structure and are removable and replaceable therewith, and also to combine with the said heating means an adequate and effective hot air circulating means which shall be uniformly diffused throughout the entire oven and in and about the press device or structure therein.

A still further object of the invention is to associate with the glass handling appliances for each press unit suitable means for indicating to the operator when pressure shall be applied and when the vacuum shall take the place of pressure, thus providing for the performance of these functions at a clearly indicated time, and thereby synchronizing such opposing steps in a rapid and dependable manner, resulting in a routine method of continuous factory production. In fact it is the purpose and intent of the present invention to so organize and arrange all of the instrumentalities entering into the construction of the machine, that the various operations in processing become a cycle of movements repeated continuously during the hours of production, eliminating the hazard of variable time being given to heat and pressure, resulting in a uniformity and superiority of product and a capacity for manufacture economically essential to the industry.

With these and other objects in view which will be apparent to those familiar with the art as the nature of the invention is better understood the same consists in the novel arrangement and construction of parts hereinafter more fully described, illustrated and claimed, and while the various phases of the invention are necessarily susceptible of structural modification without departing from the spirit or scope thereof, preferable and practical embodiments of the invention are shown in the accompanying drawings, in which:—

Figure 2:
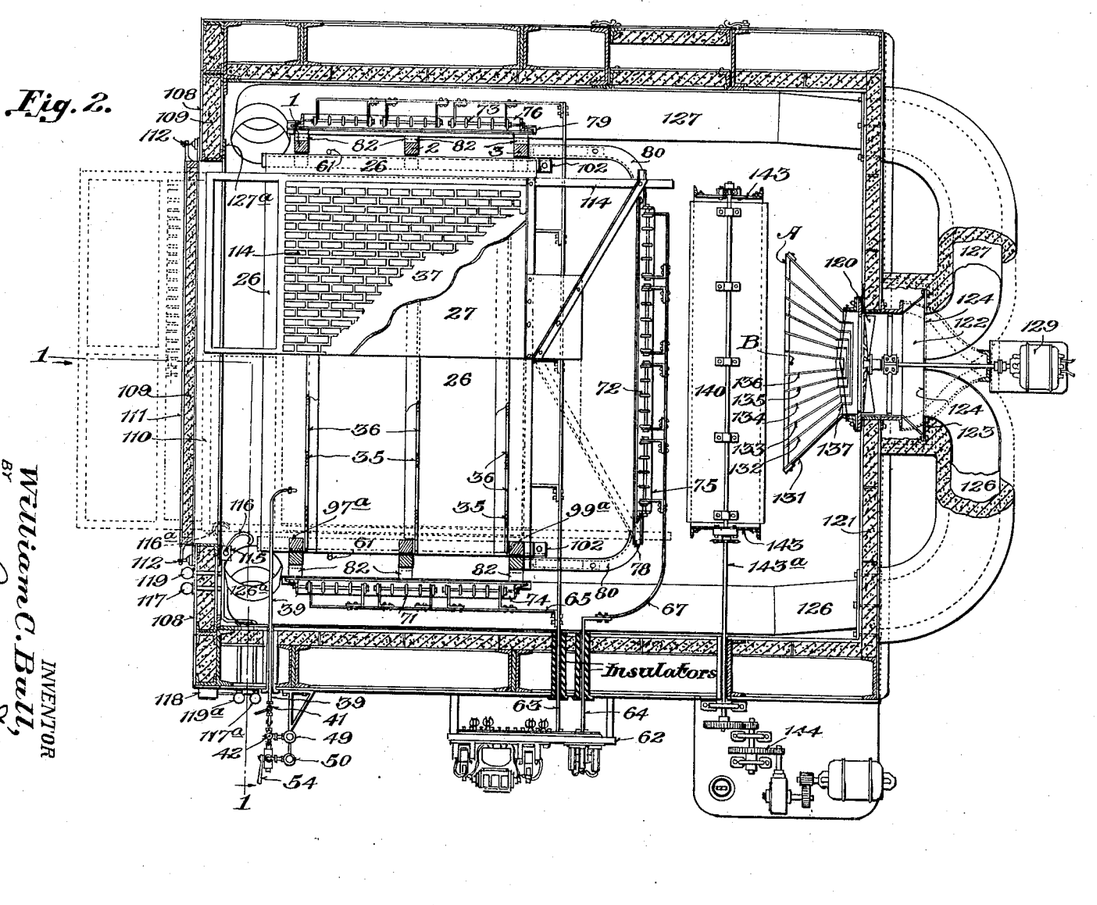
Figure 2 is a horizontal section along line 2—2, Figure 3.
Figure 3:
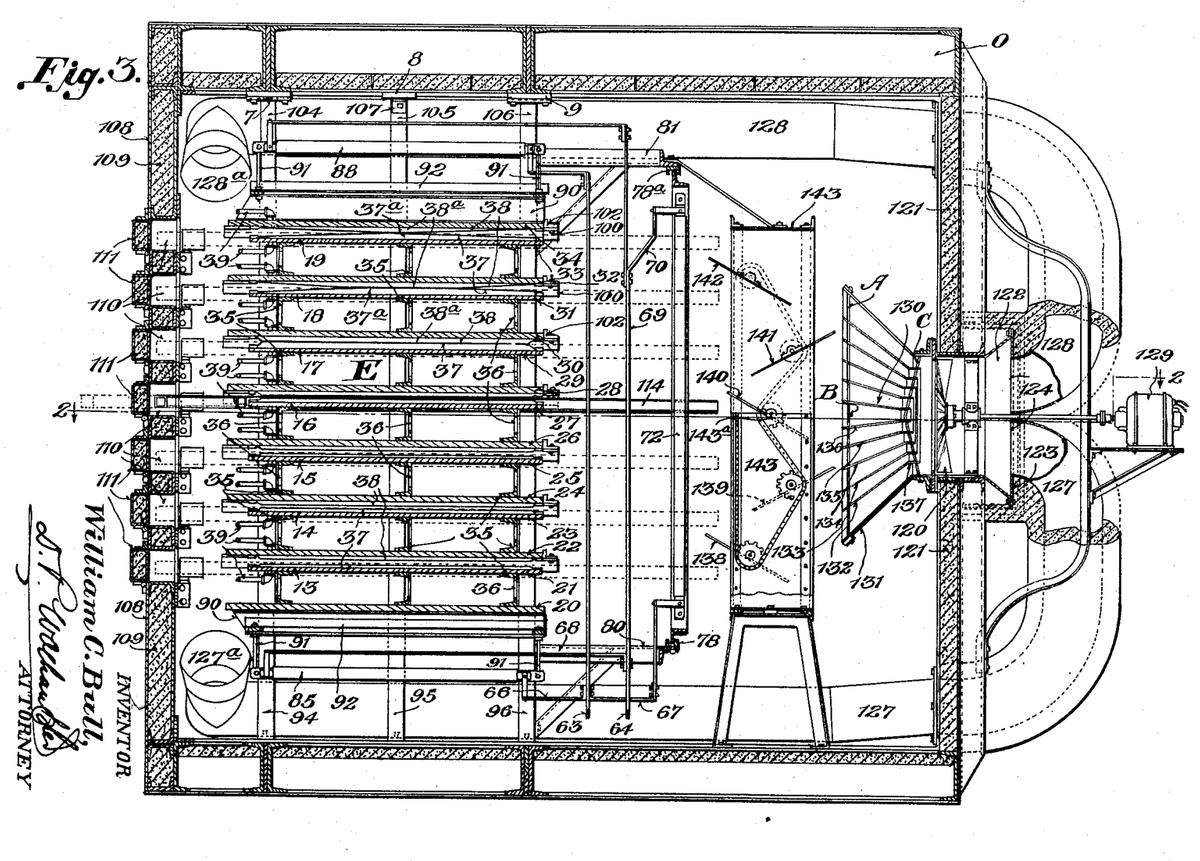
Figure 3 is a vertical longitudinal section of the apparatus.

In carrying forward the present invention the fundamental parts of the machine are not essentially different from the fundamental parts of the machine disclosed in my former Patent No. 1,575,969, granted March 9, 1926, wherein the laminated glass article is operated upon within a press within a sealed oven, and dry heat is supplied to the oven chamber while the glass product is under pressure. That is to say, the present invention also includes in its general organization a substantially framed and built pressure resisting casing, cabinet or oven designated generally by the reference letter O and within the oven chamber is assembled a multiple press device designated in its entirety by the reference letter E and positioned between a plurality of position columns 1, 2, 3, 4, 5, and 6, (Figure 2) which in turn are secured in place by the holding blocks 7, 8, 9, 10 and 11 as shown in Figures 1 and 3; other similar holding blocks not being shown.

The press or press device E is composed of a multiple number of individual press units indicated respectively by the reference numbers 13, 14, 15, 16, 17, 18 and 19 (Fig. 3), the said complete press or press device being made up of a base plate 20 surmounted by the individual press units consisting respectively of the paired platens 21—22; 23—24; 25—26; 27—28; 29—30; 31—32; 33—34; the said platen 34 constituting the top or cover platen of the press assemblage. Between the lower platen of each press unit and the next platen below the same are interposed a multiple number of spacing members 35 (Fig. 3) each having a plurality of perforations 36 through the webs 36ª thereof to permit of the free circulation of air between and about the individual press units.

To the upper surface of platens 21, 23, 25, 27, 29, 31 and 33 is cemented and clamped a flexible diaphragm 37, and to the underside of platens 22, 24, 26, 28, 30, 32 and 34 is cemented and clamped a flexible diaphragm 38 of equal area to diaphragm 37. Thus, each individual press unit consists of upper and lower rigidly mounted platens and pliable pressure members 37 and 38 secured to the respective platens and operable in the space or interval therebetween, the space between the pliable pressure members or diaphragms and the platens to which they are attached constituting closed diaphragm chambers designated respectively 37$^a$ and 38$^a$ and which are in communication with the pressure and vacuum lines of the system as will be more particularly referred to.

Figure 1:
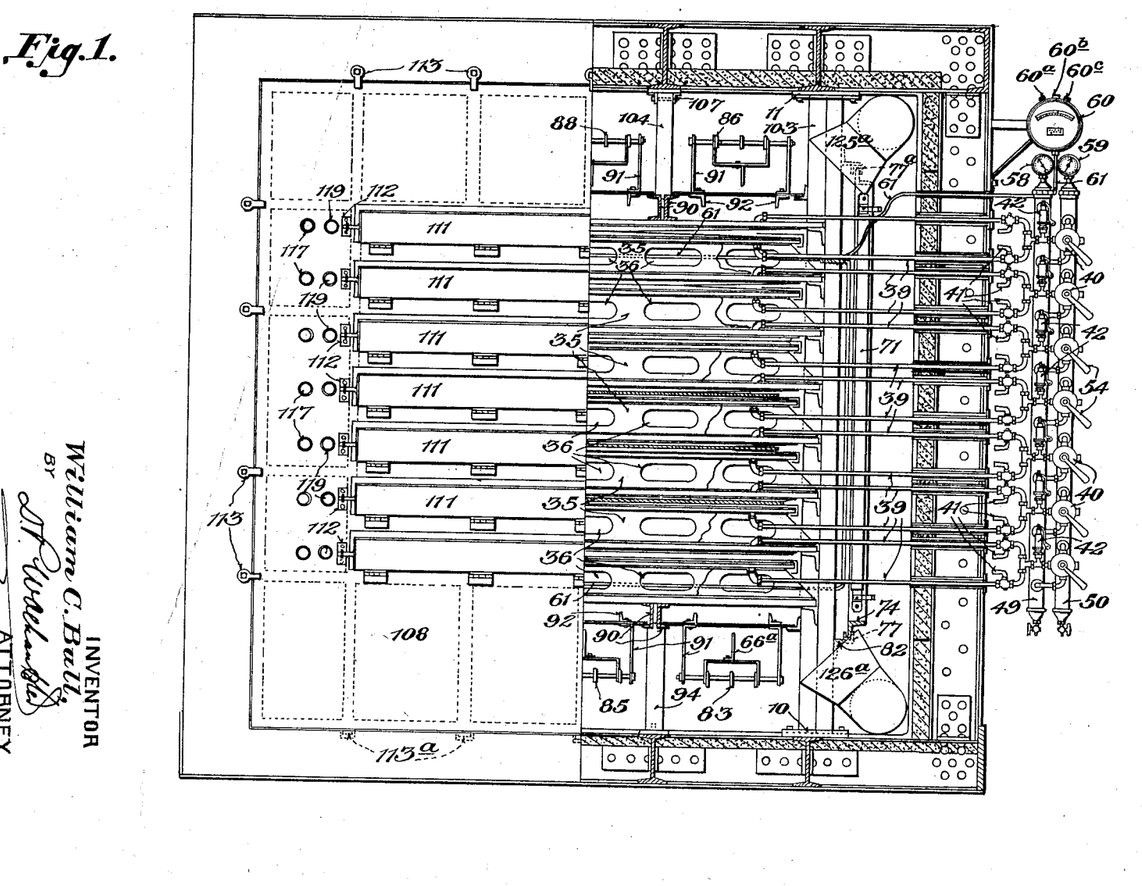
Figure 1 is a front elevation of an apparatus showing one-half of the removable front with apertures for passing of product in process of fabrication, and one-half of a vertical section along line 1—1 of Figure 2.
Figure 10:
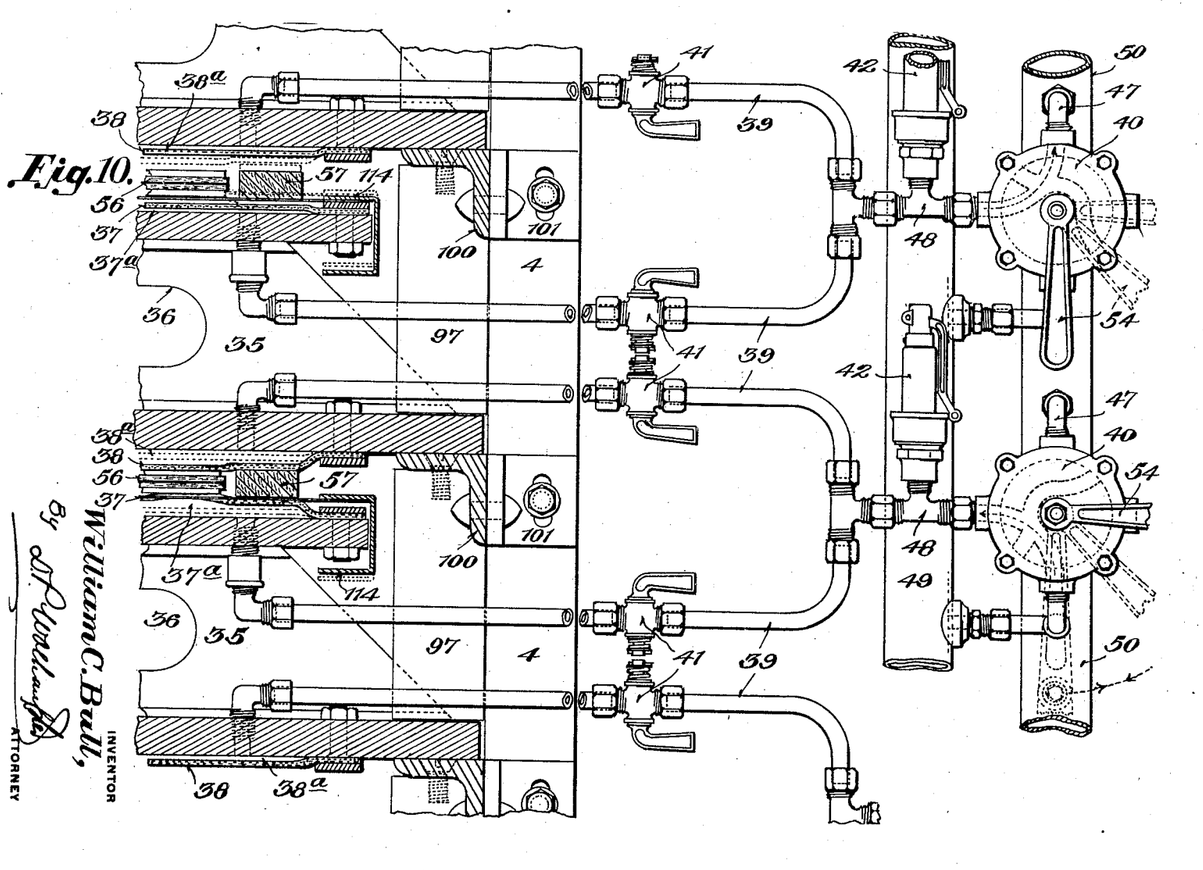
Figure 10 is a vertical detail section of two press units showing relationship to position columns, spacing studs with attached slideway supporting the press unit, conduits leading from press platen diaphragm chamber to valve controlling pressure and vacuum means from respective manifold supplies.

As a means for transmitting compression fluid and vacuum means to the diaphragm chambers 37$^a$ and 38$^a$ (Fig. 3), conduits as 39 are attached to each platen and respectively pass through the outer wall of the apparatus and finally connected with control valves 40, Figs. 1 and 10. Inserted in each conduit are shut-off valves 41 and safety valves 42—42, Figs. 1 and 10. The control valves 40 are constructed with a container body 43 and cover 43$^a$ (Fig. 12) having four ports 44, 45, 46, 47 (Fig. 11), about its periphery. The port 44 connects through the safety valve fitting 48 to conduits 39 leading to the lower and upper diaphragm chambers 37$^a$ and 38$^a$ (Fig. 10) of each press unit. Port 45 connects with the compressed fluid manifold 49; port 46 is for free discharge to the open space; and port 47 connects with the manifold 50 furnishing vacuum means.

Figure 11:
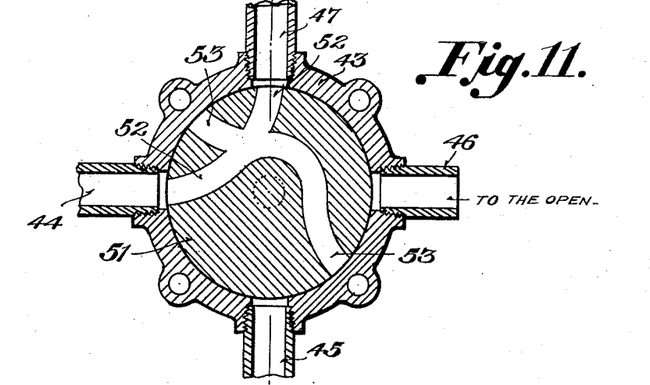
Figure 11 is a vertical section along line 11—11 of Fig. 12.
Figure 12:
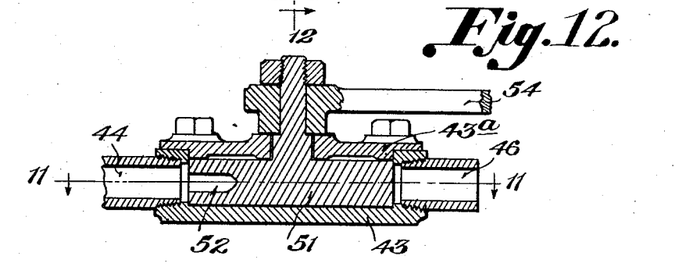
Figure 12 is a transverse section on line 12—12 of Fig. 11.
Figure 13:
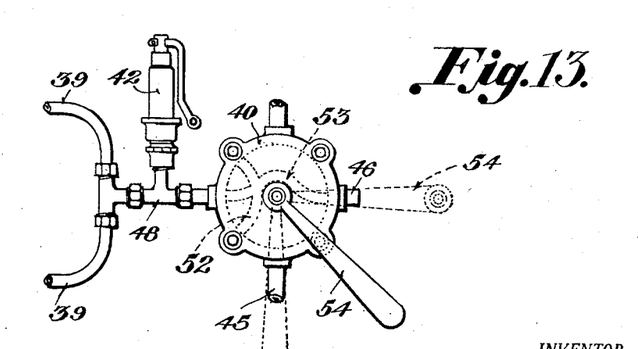
Figure 13 is a graphic elevation of valve showing control lever, connecting rod and conduit connections.

Within the container body 43 is a closely fitting revolvable float or valve disk 51, Figs. 11 and 12, with transverse port-ways 52 and 53 so positioned that when the float 51 is moved by the control lever 54 to a position that port-way 52 registers with ports 44 and 45 then compressed fluid or air will pass from manifold 49 through conduits 39 to diaphragm chambers 37$^a$ and 38$^a$, in which position it shall remain during the compression period. After a predetermined period, pressure is released by moving the control valve lever 54 to such position that port-way 53 shall register with ports 44 and 46 (Fig. 11), thus allowing compression fluid to escape into the open. By a further movement of the lever 54 to cause port-way 52 to register with ports 44 and 47 vacuum means from manifold 50 is established with the diaphragm chambers 37$^a$ and 38$^a$, causing complete deflation of the diaphragms for the effect of maintaining a permanent pliancy of the diaphragm structure, thereby, adding materially to the life and long service of the diaphragms. This complete deflation of the diaphragms by vacuum means will provide the maximum amount of space between the upper diaphragm 38 and lower diaphragm 37 for the more ready removing and insertion of the sliding trays 114, with the superimposed load of assembled glass 56 and shield 57, Fig. 10, as will hereinafter more fully appear.

If it be desired to operate all press units simultaneously a connecting bar 54$^a$ (Figs. 1 and 10) linking the several handles 54 may be employed to cause the pressure and vacuum means to function throughout the press E in the same maner as is accomplished by the lever handle 54 operating each valve independently one of another.

In order to ascertain the amount of pressure being exerted on the product a pressure gauge 58 is attached to the manifold 49. For ascertaining the degree of vacuum a reading is obtained from the gauge 59 attached to the manifold 51 (Fig. 1). Also an indicating instrument 60 is conveniently located adjacent to the means for controlling pressure and vacuum, having a mercury vapor tube 61 or equivalent means extending through the wall of the apparatus and circumscribing the press E in order to assure a dependable indication of the temperature of the heat chamber, and automatically control the flow of electric current into the heating elements, when the temperature drops below or rises above a predetermined degree, which normally approximates 280° F. The operating means for such thermal control is maintained by connection of 60$^a$, 60$^b$ and 60$^c$ to relays for automatically operating main line contactors upon the panel board 62 (Fig. 2).

Provision for heating the oven chamber, in proximity to and about the press device or structure is made through suitably arranged electrical heating elements and the current supplying connections therewith. From the panel board 62 are extended bus-bars 63 and 64 through the walls of the apparatus, and respective branches 65, 66, and 67 to the negative terminals, and branches 68, 69 and 70 to the positive terminals of the electric heating elements 71, 72 and 73 (Fig. 2) grouped vertically in frames 74, 75 and 76, positioned in channel receptacles 77, 78, 79 and 77$^a$ and 78$^a$ and 79$^a$, attached to brackets 80 and 81 (Fig. 3) secured to position columns 3 and 6 also by brackets 82 attached to position columns 1, 2, 3, 4, 5 and 6 (Fig. 2). Heating elements 83, 85, 86 and 88 in six groups equally distributed beneath platen 20 and above platen 34 are positioned upon brackets 89 (Fig. 1) attached to position columns 1, 3, 4 and 6, also supported by reinforcement channels 90, respectively above and beneath platens 20 and 34; each group being assembled upon bracket supports 91 properly spaced by angles 92. Thus, the particular assembly of heating elements located respectively at the back, sides and top and bottom of the press device or press structure become a part of the press structure supports, not only affording an efficient location of the heating elements, but making them in fact a part of the press or press device and mountable and demountable therewith.

Referring further to the press units mountings it will be seen that the individual press unit 13 (Fig. 3) is supported in place by columns 93 and 94 shown in Fig. 1, (other similar position columns not shown) and columns 94—95 and 96, Figure 3. When this press unit is placed in position, spacing columns like 97, Figs. 1 and 10; also 97, 98 and 99 of Fig. 2, and other similar spacing columns (not shown) have an angle slide-way 100, Figs. 8, 9 and 10, secured to the top of each spacing stud or column 97, 98 and 99 (typical of all other spacing columns), each of such slide-ways to be secured in place by brackets 101 (Fig. 10) fastened to position columns 1, 2, 3, 4, 5 and 6, furnishing thereby ready means of assembling the press E, but particularly to provide ample support for each press unit 13, 14, 15, 16, 17, 18 and 19, when being operated individually.

Figure 8:
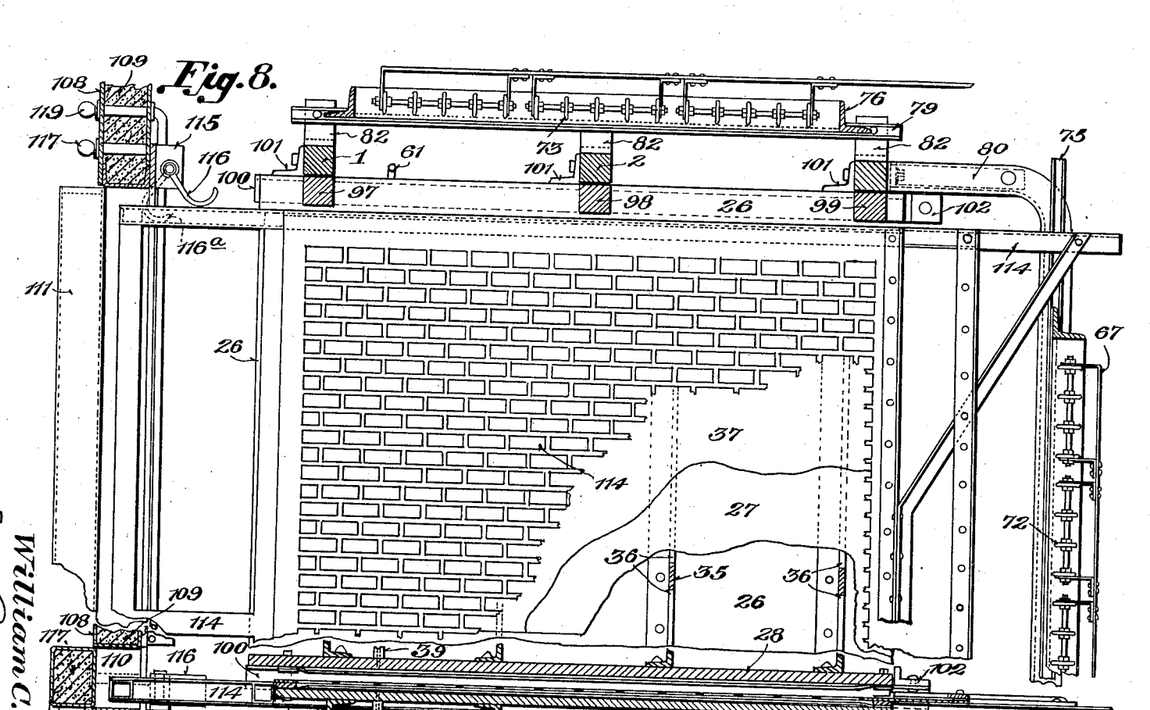
Figure 8 is a detail plan of one-half of a sliding tray showing a perforated metal sheet forming the supporting means of the tray, and relationship of this assemblage to the position columns, spacing studs, heating elements and switch controlling the signal lights at the apertures in the panel front.
Figure 9:
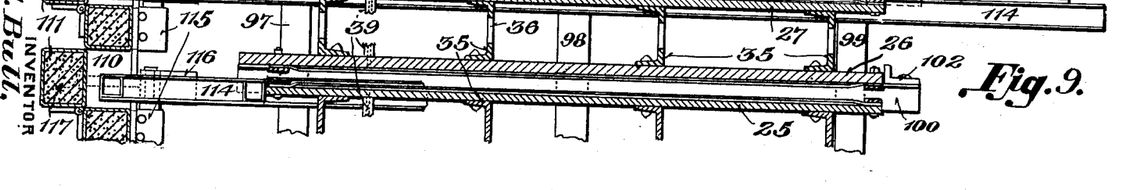
Figure 9 is a vertical section through a press unit showing the relative position of sliding trays between the inflatable diaphragms, apertures in the removable front and means for engaging contact switch controlling display of signal lights.

Upon completing the assemblage of press E the top or cover plate 34 is positioned on the uppermost pair of slide-ways, its proper location being indicated by contact with stop 102, Figs. 3, 8 and 9, which stops are secured at the innermost end of all slide-ways, thus assuring all individual press units registering properly one with another when the press E is assembled.

Above the top plate 34 are secured in place, respectively upon said plate 34 and reinforcing channels 90, the thrust columns 104, 105 and 106, with suitable fastenings 107.

A removable closure or panel front 108 (Fig. 1), covering the full size front opening of the oven or heat chamber is constructed of substantial frame work and cover plates, the space voids within being filled with insulating material 109 for conservation of heat.

At proper positions through this front closure or panel are apertures 110, having hinged shutters 111 normally kept closed by compression springs, or equivalent means, such as latches 112, the closure itself being secured to the walls of the structure in a substantial manner by fastenings 113 and tenons 113a. The apertures 110 through the closure are so positioned in relation to the openings of each press unit that easy passage of the sliding tray 114, with its superimposed load, is assured. The tray engages the upper platen plate along its lateral edges, and may readily be pushed home to their proper relative positions.

To assure a uniformity of processing results for the product it is particularly important that the materials be retained under pressure and heat only for a specific time, which has been predetermined. In order to attain this end a time limit is established to govern each individual press unit with precision, so that a continuous processing procedure for each working hour may be followed.

A means for accomplishing a dependable time period for the materials to be under pressure is effected by the automatic operation of a contact switch 115, Figs. 8 and 9, having a wiping arm 116, under spring tension. This arm 116 on being moved inwardly by the frame of the sliding tray 114, when being passed through the aperture 110, closes contacts within the switch 115 to show a colored light at the lamp 117 beside the apertures, as well as a similar light at the corresponding control valve. This operation, in turn, energizes a clock movement 118 (Fig. 2), located adjacent to the bank of control valves 40, each valve controlling the respective press unit in which the sliding tray 114 has been placed.

When the process period has been accomplished, which usually is approximately ten minutes, an opposing electric contact has been made extinguishing the colored lights 117 and 117a, causing white lights 119 and 119a to be displayed as signals to the operator controlling the pressure and vacuum means, through respective movements of valve lever 54, that the processing time has been completed and that he shall operate the control valve accordingly.

Incidental to this change in signals to the control operator a like signal is given to the attendants handling the sliding trays, giving notice to them that the respective shutter 111 should be opened and the tray withdrawn, which on being done extinguishes the white light (leaving none showing) since the wiping contact 116 following the tray outwardly takes the position 116a, thereby, opening the switch, and same so remains neutral for the approximate interval of three minutes during which time a duplicate tray, previously loaded by the assembling operators, has been prepared with materials for the press, which on passing into the aperture repeats the cycle above described.

This is a means and procedure new to the art of fabricating reinforced laminated glass.

Uniformity of temperature and its equal distribution to all parts of the press E are vital factors in the fabrication of reinforced glass. To maintain these conditions, electricity has proven in practice to be the most dependable means, and at rate of cost same may be produced is the most economical for heat. The preferable means for application is through radiation resistance elements, commonly known as space heaters, or equivalent type of resistance units. In my apparatus or machine the space heater type has proven most convenient as arranged and shown in Figs. 1, 2 and 3, to wit, the heater elements, 71, 72, 73, 83, 85, 86 and 88. These are disposed about the five sides (top, bottom, back and two opposite sides) of the press in the manner shown and give such ample source of radiation to the metal parts of the press as to assure, a very low cost for heat.

Figure 4:
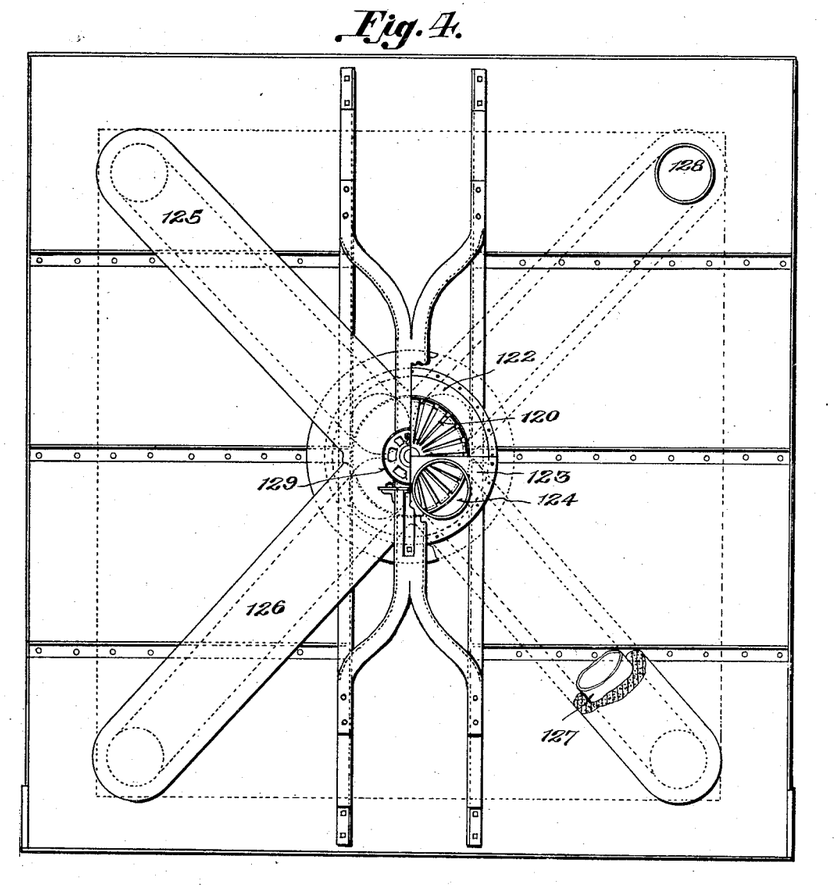
Figure 4 is a rear elevation of the apparatus.

To accomplish uniform distribution of heat at a minimum cost an air impeller 120 operated by motor 129 is embodied in the back wall 121 of the oven structure. The impeller is encompassed by an enlarged air chamber 122 with cover 123, having four port openings 124, Figures 3 and 4, connected with four air ducts 125, 126, 127 and 128 (Fig. 4) extending in easy curves to the four lateral corners of the oven, piercing the rear wall, thence to the four corresponding inner corners of the oven adjacent to the removable front 108, where each duct terminates with an enlarged funnel shaped intake 125$^a$, 126$^a$, 127$^a$ and 128$^a$, Figures 2 and 3, facing towards a common center in front of the press E. Thus, the impelled air is forced between the platen plates of each individual press unit, over, beneath, through and about the press E, and is drawn to the intakes 125$^a$, 126$^a$, 127$^a$ and 128$^a$ in equal proportion through the four ducts to the impeller chamber for a repetition of this cycle.

Air which is discharged from a rapidly revolving fan takes on a columnated formation for a considerable distance along its axial line of flow. Therefore, in order to obtain greater efficiency in air circulation, and for the purpose of its use in this apparatus, it is important that the initial pressure of the air leaving the impeller 120 be not lost through friction and absorption in surrounding atmosphere, but delivered at as nearly its orginal pressure as possible over the full area of the deflector enclosure 143 within the oven chamber but adjacent to the impeller 120. To accomplish this end a spreader 130 is interposed, the same consisting of a multiple assemblage of funnel shaped vanes 131, 132, 133, 134, 135 and 136 concentrically positioned and spaced one to the other, all relatively close to the impeller 120, and one of which vanes, the outer one 131, being attached to the air chamber 122 for the impeller. Each vane is definitely positioned by means of the quadrangular fixed tie rods A, B and C.

The intake periphery of each spreader vane, for a limited distance, is made parallel to the air path developed by the impeller 120, thence a curvilinear formation is introduced to divert and spread the split-up column of air, creating thereby an air blast which envelops the entire area of the press E.

To further assure the delivery of a constantly dependable volume of air between the platen plates and through the individual press units, the impelled air after leaving the spreader or separator 130 comes in contact with a multiple number of slowly revolving deflecting blades 138, 139, 140, 141 and 142 within the deflector closure or frame 143 located as shown in Figures 2 and 3. The movement of the deflecting blades may be oscillating or rotating by means of shafts having impinioned thereon sprockets driven by chain from a master shaft 143$^a$ extending through the walls of the structure to a motor driven transmission means 144.

It has been found by practice through means of this deflector 143, that the air sweeps with precision upwardly and downwardly across and through the press E in a manner to assure a uniform dispersion of heated air to every part of the press. By no other means has it been found possible to obtain a dependable uniform temperature at every part of the press E, serving likewise the important purpose of dissipating any vapors which may arise during the processing period of the product, also the more efficient evaporation of extruded solvents resulting during fabrication of the article.

Figure 5:
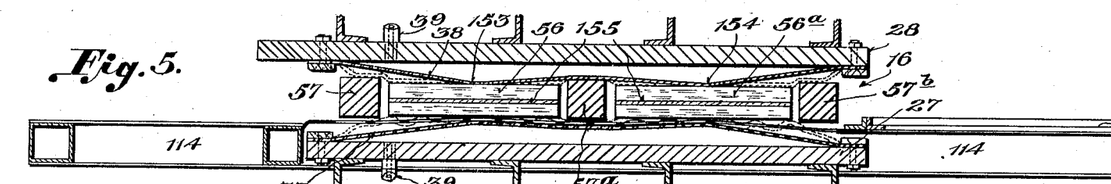
Figure 5 is a detail graphic vertical section showing a sliding tray with its superimposed load of assembled glass, with sections of the shield surrounding same, upon a perforated metal sheet inserted between the upper and lower platens of a press unit, showing how the inflated diaphragm above and beneath attain an initial ballooning contact at the central area of the glass to be compressed.
Figure 6:
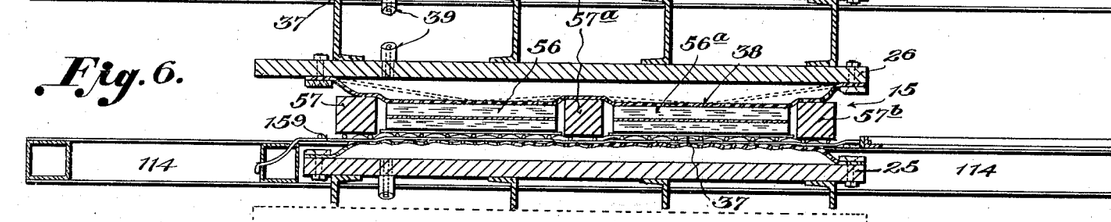
Figure 6 is a detail graphic section showing a sliding tray with its superimposed load of assembled glass, with sections of the shield surrounding same, upon a woven wire screen, showing how the fully inflated diaphragm above and beneath spread out covering the glass area under compression during the processing period.

Having now covered by description the various instrumentalities entering into the organization of the improved fabricating machine a more detailed reference to the operation of the paired flexible diaphragms will be given. This is well exemplified by the graphic Figures 5 and 6, showing a press unit 16 with a sliding tray 114 bearing a superimposed load of assembled glass 56 and 56$^a$, also cross sections of the shields 57, 57$^a$ and 57$^b$, adjacent to and surrounding the glass. In these figures of the drawings are also shown the initial ballooning contour of the pliable diaphragms 37 and 38, each having first contact with the central zone of the glass area at 153 and 154.

It will be observed that the article-confining frame 57 which has been termed a shield contributes in a practical manner to the outwardly wiping pressure exerted by the upper and lower diaphragms upon the fabricated article by reason of preventing the diaphragms from first striking the edges of the fabricated article when the inflating pressure is placed in the diaphragm chambers. These shields may be of any material suitable for the purpose but as shown are of somewhat greater thickness than the assembled glass and interposed membrane, thereby assuring the full effect of the centralized ballooning contact of the diaphragms upon the materials before the diaphragms flatten out over the entire surface of the article, as clearly shown in Fig. 6 of the drawings. It will be seen that the shield 57 is formed with openings $o$ of a sufficient size to freely receive, but confine therein, the fabricated glass product to be processed within the apparatus. Also, it may be noted at this point that a practical way to support the assembled material upon the sliding tray is to provide each tray with a light flexible woven wire supporting screen 159, which on account of its flexibility does not interfere in the least with the progressive pressure exerted above and below on the article by the pliable diaphragms 37 and 38. While a light metallic screen 159 may be employed as the supporting element carried by the tray, it will of course be understood that a textile fabric or equivalent material can be utilized as the article supporting element.

Figure 7:
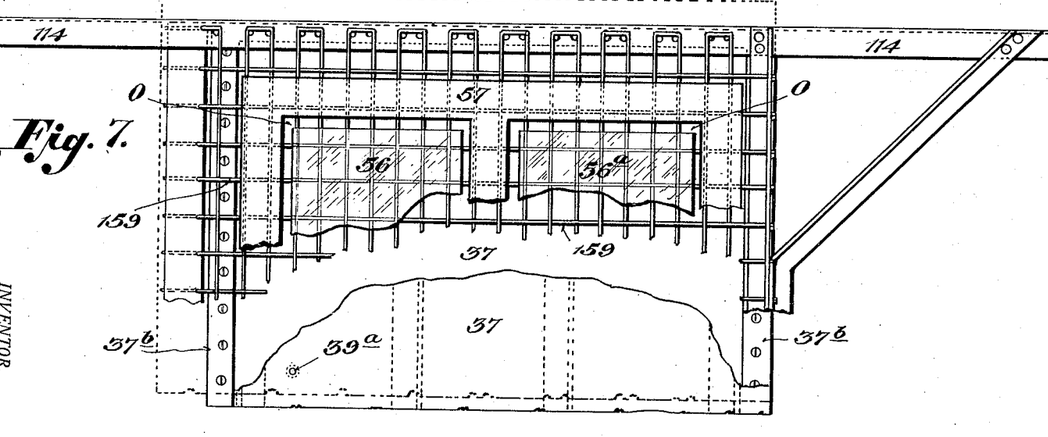
Figure 7 is a partial graphic plan showing a sliding tray with its superimposed load of assembled glass and perforated shield, surrounding same, borne upon the woven wire screen.

At this point reference is made to Fig. 7 of the drawings which shows a broken-away section of the diaphragm 37 and means 37^b for clamping the same to the press platen. Also, there is shown in this figure of the drawings orifices 39^a for the admission of air or fluid into the diaphragm chamber.

It should be noted that special advantages accrue from the use of two opposite flexible diaphragms constituting the pliable pressure members. These members, when inflated, simultaneously exert pressure respectively on opposite sides of the glass product progressively from its central zone to the edges thereof thereby compelling the extrusion of superfluous plasticized material as well as forcing out and dispelling bubble formations which may become impounded during the assembling of the components. Furthermore, it has been found from operations of this type of apparatus that the pliable pressure, obtained from a flexible surface at top and bottom of the article, lends itself most advantageously to any unplanity of surface of the glass material, giving pressure to a depression in the glass equal to that obtained on any superficially elevated surface of the glass, thereby limiting to a minimum the risk of fracture of the glass. This is impossible to obtain between inflexible or rigid compression members such as found in other types of presses, even with an elastic sheet of compressible material interposed. Also, the provision of two opposite pliable pressure members is of practical importance because the lower pliable pressure member acts as a cushioning support and at the same time exerts a similar action and pressure at the lower side of the article that the upper diaphragm exerts at the upper side of the article. Again, this use of the upper and lower pliable pressure members provides a press construction wherein it is possible to make the initial pressure on the article relatively light and then gradually increasing the pressure to the ultimate predetermined requirement, insuring a uniform and well bonded product throughout, and in that connection it is to be noted that because of these features inexpensive, as well as unground and polished glass may be successfully fabricated by the use of the present invention.

Figure 14:
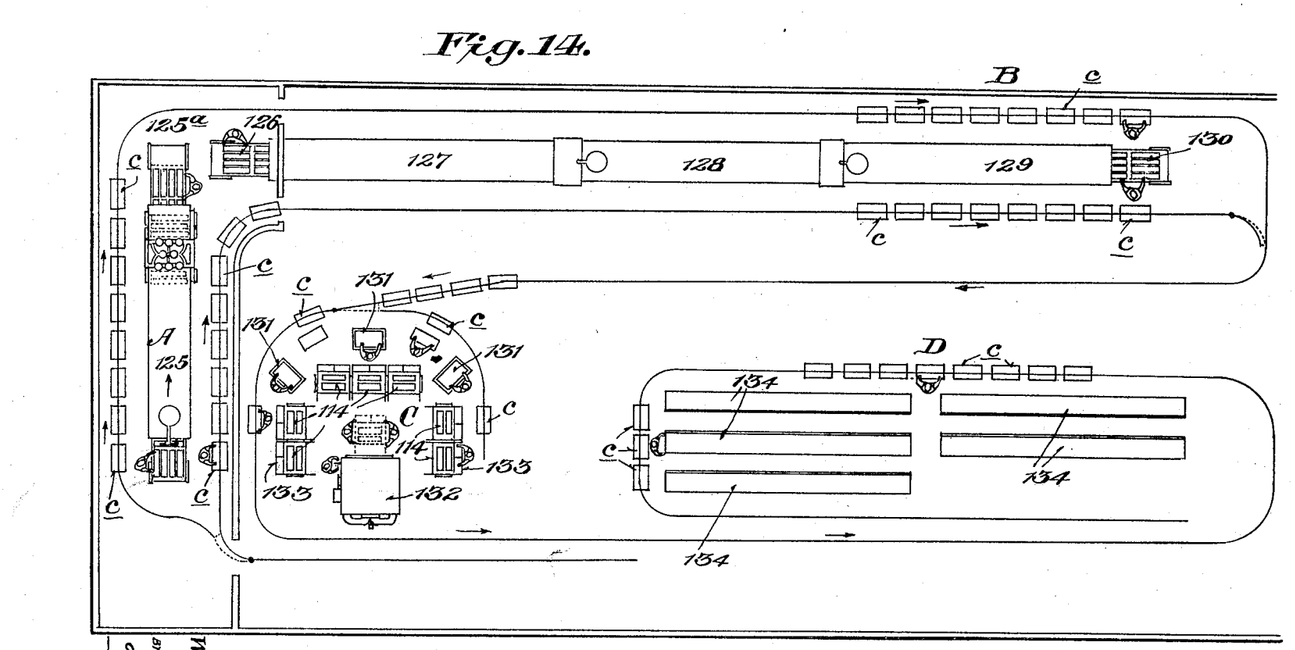
Figure 14 is a diagram of a factory layout embodying the various fabricating units preferably associated with the present invention.

The use of the sliding tray 114 facilitates the handling of large quantities of glass expeditiously and with safety and each tray is adapted, with the glass assemblings thereon, to be inserted through an aperture in the panel front and may be conveniently guided in and out of the press by providing a sliding engagement between its side edges and the side edges of the lower platen of the particular press unit with which it is associated, as is clearly shown in Fig. 10 of the drawings; and in Fig. 14 of the drawings is illustrated a factory layout showing how, by means of duplicating these trays, production can be expedited, one tray being in the apparatus while a duplicate tray is being loaded with material for fabrication.

Reference has already been made to the independently operable character of the individual press units which is an important phase of the invention adapting it to logical plant or factory procedure, and in that connection an improvement of special advantage is the means of individual control of compressed air or other fluids by connecting each diaphragm chamber with a conduit leading to a single four-way control valve which not only connects with and controls the pressure supply, but also the vacuum means utilized for complete deflation of the diaphragm. Also, an improvement of practical importance in the extensive commercial use of the improved fabricating machine herein described is the provision for conserving the heat, and the novel positioning of the heating means and the spreading and deflection of the air in conjunction therewith so that the means for heat is not only adjacent to the press assemblage but in and about the press assemblage thereby producing a quick and effectual welding together of the glass and the interposed membrane.

It will now be seen that the present invention involves a continuous process for the manufacture of a laminated glass product, which process is new in this art. To exemplify the same reference is made to diagrammatic Fig. 14 of the drawings illustrating the successive steps observed in the fabrication of the product, and which steps may be organized in any approved plant lay-out to operate a large number of processing machines according to any "production" and time schedule.

Referring particularly to the diagram of Fig. 14 the various instrumentalities representing the essential steps in the process of fabricating are: A the cleaning station, B the coating station or unit which includes a preliminary cooler and a terminal drier, C an assembling and processing station, and D the finishing station.

At the cleaning station A there is operated a suitable dry cleaning or wet cleaning machine 125 which removes dirt or other matter from the glass sheets, and on leaving this machine the cleaned plates are placed on a suitable conveyor 126 and carried through the instrumentalities located at the coating station or unit B. These instrumentalities include a cooler designated by the number 127, a coating machine 128, and a drier 129, which may conveniently be served by the same conveying means, and provide respectively for first subjecting the cleaned glass plates to a suitably maintained refrigerating atmosphere to properly prepare the glass surfaces for receiving an adhesive coating while in the coating machine 129. After thus being coated with the adhesive substance, the coated plates are advanced through the drier 129 which is supplied with heat in any suitable manner so that at the delivery point 130 of the coating station the coated plates are ready to be transferred to suitable carriers and moved to the assembling and processing station C, which has one of the fabricating machines herein described, and designated in Fig. 14 by the reference number 132.

What has been characterized as the assembling and processing station C includes tables or benches supporting plasticizer-solution pans, at which points the assembly or consolidation is made of two sheets of coated glass and interposed celluloid or equivalent membrane, wetted by the plasticizer. The attendant at each solution pan places one sheet of glass, coated side up, in the pan of solution, over which coated side of said sheet is laid a sheet of celluloid in such manner as to eliminate any air formations and upon which sheet of celluloid is placed a second sheet of glass in like manner, and with gentle pressure a uniform firm contact is made between the assembled sheets. Then the assemblage is placed upon the trays 114 which are inserted in the machine 132 and in the manner and for the purpose already fully described.

After the processing has been completed in the machine 132 the processed product is conveyed or removed to the finishing station D at which is located one or more grinding machines 134 which grind and polish the edges of the laminated glass units, after which they may be again washed and treated for shipment.

To facilitate the handling of component parts of the laminated article to be fabricated, a pre-arranged system of handling carriers designated by the reference letter c are disposed in convenient proximity to the machines or apparatus at the several stations where the work is to be done, as steps of the process. These carriers are usually arranged upon both sides of the machines or apparatus and are attended by one or more attendants, the same carrying the glass sheets and celluloid membrane cut to predetermined size and handled in such quantities as to be available for carrying out the predetermined time and production schedule. The same reference letter is applied to these carriers throughout the diagrammatic figure of Fig. 14 of the drawings, and are simply illustrated diagrammatically so as to be understood that these carirers represent any suitable and approved form of conveyor available for the purpose, but in the present case represent a novelty as a part of the instrumentalities required for carrying out the continuous process of fabricating the laminated article.

It will now be seen that at the cleaning station A, the attendants remove the sheets of glass from the carriers, place the same in proper position upon the conveyor for feeding into the cleaning or washing machine 125 through which they pass. On arrival at the discharging end 125ª of the cleaning machine, the cleaned glass plates are hand-passed to the conveyor 126 of the coating unit B through which they pass in the order previously referred to, namely, respectively through the cooler 127, the coating machine proper 128, and the drier 129, being delivered in dried condition at the delivery point 130 and coated upon one face with an adhesive composition. This adhesive composition preferably contains gelatine, glue, casein, isinglass or colloidal composition or equivalents. Likewise the strengthening membrane which is placed between the glass sheets, preferably is coated with a like adhesive composition, and this adhesive composition preferably possesses semi-solvent activity when preliminarily treated at the solution tables 131 to a plasticizer, as for example, a derivative of alcohol, acetones or the equivalent, which give semi-plasticity to the adhesive coating of the glass sheets and to the interposed membrane at the time they are assembled together, preliminary to introduction into the processing machine 132 for permanent welding as hereinbefore described. With reference to the interposed strengthening membrane between the glass sheets, it may be mentioned at this point that the same preferably is a sheet of celluloid or equivalent substance, possessing desirable transparency and recognized strength-resisting properties.

At the assembling and processing station where the coated sheets are subjected to treatment with solvents acting as a plasticizer, a conveniently arranged grouping of tray supporting benches 133 are arranged about the machine 132, and are designed to support the matrix carrying trays 114 in which the laminated articles are placed for convenient insertion in the processing machine and removable therefrom after the expiration of the time limit allowed for the permanent bonding of the laminæ of the article.

In the diagrammatic figure of Fig. 14, the arrows indicate the direction of movement of the handling carriers c respectively along side of the cleaning machine 125, along side of the coating unit B to the assembling and processing stations C, from the processing machine B to the finishing station D; where the grinding and polishing machines 134 are located.

From the foregoing it is thought that the distinctive features of the fabricated machine and the novel process associated therewith will now be apparent without further description, and it is thought that various changes in the form, proportion and minor details of the machine and process may be resorted to, without departing from the spirit of the invention and scope of the appended claims.

I claim:—

1. A glass product fabricating machine including a casing, a press unit therein comprising a pair of superposed pliable inflatable pressure members between which the glass product is processed, and pressure and vacuum means acting successively on said two members to respectively inflate and deflate the same.

2. A glass product fabricating machine including an oven, a press therein having opposite pliable pressure members, pressure and vacuum means acting against said members, and a single control for said pressure and vacuum means.

3. A glass product fabricating machine comprising a casing, a press unit mounted therein and including an inflatable pliable pressure member, pressure means for inflating said member, vacuum means acting to withdraw the pressure member from the completed product after the pressing operation, and article holding means separate from the pressure member movable into and out of operative relation to the pressure member.

4. A glass product fabricating machine including an oven, a press therein having opposite inflatable pliable pressure members, pressure means for inflating said members, and vacuum means acting to release and withdraw the pressure members from the completed product.

5. A glass product fabricating machine including an oven, a press therein having opposite pliable pressure members, pressure means acting to press said members simultaneously against the opposite sides of the product, vacuum means acting to release and withdraw the pressure members from the product and a single controlling device for the said pressure and vacuum means.

6. A glass product fabricating machine including an oven, a press therein including a press unit comprising spaced platens, opposite pliable pressure members attached respectively to the separate platens, fluid pressure means acting against the pressure members, vacuum means acting to collapse the pressure members and a single control device for said pressure and vacuum means.

7. A glass product fabricating machine including an oven, a press therein having opposite pliable pressure members, article holding means including a shield adapted to be supported between said pressure members and to confine therein the glass product to be welded, and pressure applying means acting on said pressure members.

8. A glass product fabricating machine including an oven, a press therein having opposite pliable pressure members, article holding means including a shield adapted to be supported between said pressure members and to confine therein the glass product to be welded, pressure and vacuum applying means acting on said pressure members.

9. A glass product fabricating machine including an oven, a press therein having opposite pressure members, article holding means including a shield adapted to be interposed between said pressure members and having a confining opening to receive therein the article to be welded, said shield being of greater thickness than the said article and adapted to constitute an abutment against which the pressure members bear, and pressure means acting on said pressure members.

10. A glass product fabricating machine including an oven, a press therein including a press unit comprising spaced platens, pairs of opposite inflatable pliable diaphragms attached respectively to the separate platens and forming therewith diaphragm chambers, fluid pressure means in communication with said diaphragm chambers, vacuum means in communication with said diaphragm chambers and means for controlling the pressure means and the vacuum means.

11. A glass product fabricating machine including an oven, a press therein including a press unit comprising spaced platens, opposite pliable diaphragms attached respectively to the separate platens and forming therewith diaphragm chambers, fluid pressure means in communication with said diaphragm chambers, vacuum means in communication with said diaphragm chambers and a single controlling valve for the pressure and vacuum means to alternately render the same active and inactive.

12. A glass product fabricating machine including an oven, a press therein having opposite pressure members, pressure supplying means, and article holding means including a tray and a shield carried by the tray and having a confining opening therein to receive the laminated article to be bonded.

13. A glass product fabricating machine including an oven, a press therein having opposite pressure members, pressure supplying means, an article holding means including a sliding tray adapted to be inserted between the pressure members and a shield supported by the tray and having a confining opening to receive therein the laminated article to be bonded.

14. A glass product fabricating machine including an oven, a press therein having opposite pressure members, pressure supplying means and article holding means including a sliding tray having a yieldable supporting element and a shield seated on said supporting element and having a confining opening to receive therein the laminated article to be bonded.

15. A glass product fabricating machine including an oven, a press therein including a press unit comprising spaced platens and opposite pliable diaphragms attached respectively to the separate platens and forming therewith diaphragm chambers, pressure supplying means in communication with the said diaphragm chambers and article holding means including a tray having a sliding engagement over the lower platen and lower diaphragm and a shield seated on the tray and having a confining opening to receive therein a laminated article to be bonded, said shield being of greater thickness than the said laminated article.

16. A glass product fabricating machine including an oven, a press therein including a press unit comprising spaced platens and opposite pliable pressure members attached respectively to the separate platens and forming therewith fluid pressure chambers, pressure supplying means, vacuum means, piping connections with said fluid pressure chambers and a single four-way controlling valve connected with the said pipe and with the said pressure supplying and vacuum means thereby to provide a single control for placing the said pressure members under the influence of pressure or vacuum.

17. A glass product fabricating machine including an oven, a press assemblage therevided with normally closed apertures, a press device mounted within the oven and comprising a plurality of similar press units each having means for exerting pressure upon the laminated article to be processed, an article holding means including a sliding tray for each press unit adapted to be inserted in and removed from the press unit through one of said apertures.

18. A glass product fabricating machine including an oven having in the wall thereof a plurality of normally closed apertures, a press device mounted within the oven and comprising a plurality of similar press units each arranged in line with one of said apertures and each having means for exerting pressure upon the laminated article, independently controlled pressure supplying means for each press unit, an article holding means including a sliding tray adapted to be inserted in and removed from each press unit through one of said apertures.

19. A glass product fabricating machine including an oven having in one of its walls a plurality of normally closed apertures, a press mounted within the oven and comprising an assemblage of similar press units, each consisting of a pair of spaced platens and pliable pressure members attached thereto, pressure supplying means for each press unit having a control independent of the control for the pressure supplying means of the other press units, an article holding means for each press unit including a sliding tray adapted to be inserted and removed through the aperture in the oven wall lying opposite said press unit.

20. A glass product fabricating machine including an oven, a multiple-unit press assemblage mounted within the oven and spaced from the front and rear walls thereof, means for heating the oven spaces about the press assemblage, means for introducing and spreading a volume of air into the oven from the rear wall thereof, air deflecting means, and means for exhausting the air from the oven chamber at various points from the front thereof.

21. A glass product fabricating machine including an oven, a press assemblage mounted within the oven, heating elements arranged in the oven spaces about the press assemblage, and an air circulating system including an air impeller for directing a volume of air into the oven chamber, an air spreader associated with said impeller to spread the air at its point of entry into the oven chamber and piping communicating with the impeller and the front part of the oven chamber to provide for the return of the air from that part of the oven.

22. A glass product fabricating machine including an oven, a press assemblage therein, heating means within the oven chamber, an air circulating system including means for introducing air into the oven chamber at one side of the press assemblage and removing it from the oven chamber at the opposite side of the press assemblage and a spreader for the incoming air consisting of a group of spaced concentric funnels.

23. A glass product fabricating machine including an oven, a press assemblage therein, an air circulating system having means for introducing air into the oven chamber at one side of the press assemblage and for removing it from the oven chamber at the opposite side of the press assemblage, and an air deflecting device arranged in the path of the entering air and comprising a plurality of movable blades.

24. A glass product fabricating machine including an oven, a press assemblage mounted therein, heating means within the oven, an air circulating system having means for introducing air into the chamber and for removing it therefrom, said air circulating means including an air spreader for the entering air, an air deflector arranged in the oven chamber and interposed between the press assemblage and said spreader, the said deflector device comprising a plurality of spaced rotatable blades operating to distribute the air evenly throughout the oven chamber.

25. An apparatus for applying pressure to a plurality of sheets to be joined together, comprising a pair of opposite members, a pair of flexible diaphragms arranged in opposing and spaced relation and adapted to receive between them the sheets to be joined together, each diaphragm being seated across one face of one of said opposite members, and separate pressure and vacuum means operatively associated with both diaphragms.

26. An apparatus for applying pressure to a plurality of sheets to be joined together, comprising a pair of opposite members, a pair of flexible diaphragms arranged in opposing and spaced relation and adapted to receive between them the sheets to be joined together, each diaphragm being seated across one face of one of said opposite members and a supplementary supporting element associated with the lower diaphragm.

27. An apparatus for applying pressure to a plurality of sheets to be joined together, comprising a press structure including a vertical stack of press units, each of which units including a pair of members each provided with a flexible diaphragm and a diaphragm chamber at one side of the diaphragm, the two diaphragms being arranged in opposing relation and adapted to receive between them the sheets to be joined together, and pressure and vacuum means operatively related to the diaphragms of all the press units and having a common control.

28. An apparatus for applying pressure to a plurality of sheets to be joined together, comprising a casing or cabinet, a plurality of similar press units carried by said casing or cabinet and each having means for exerting pressure upon the laminated article to be united or bonded, and slidable article holding means for each press unit.

29. A glass product fabricating machine including a casing or cabinet having a plurality of apertures, a plurality of similar press units each of which consists of a pair of spaced plates and pliable pressure members attached thereto, pressure supplying means for each press unit, a common control for the said pressure supplying means from the various units, and slidable article holding means for each press unit.

In testimony whereof I hereunto affix my signature.

WILLIAM C. BULL.

CERTIFICATE OF CORRECTION.

Patent No. 1,805,389.                                                    Granted May 12, 1931, to

WILLIAM C. BULL.

It is hereby certified that error appears in the printed specification of the above numbered patent requiring correction as follows: Page 9, line 33, claim 17, strike out the comma and words ", a press assemblage there-" and insert instead having a wall thereof pro-; and that the said Letters Patent should be read with this correction therein that the same may conform to the record of the case in the Patent Office.

Signed and sealed this 3rd day of November, A. D. 1931.

(Seal)                                                                         M. J. Moore,
                                                                           Acting Commissioner of Patents.